June 25, 1935.  A. L. NELSON  2,006,009

PISTON

Original Filed May 15, 1928  2 Sheets-Sheet 1

Inventor
Adolph L. Nelson
By his Attorney

June 25, 1935.  A. L. NELSON  2,006,009
PISTON
Original Filed May 15, 1928  2 Sheets-Sheet 2
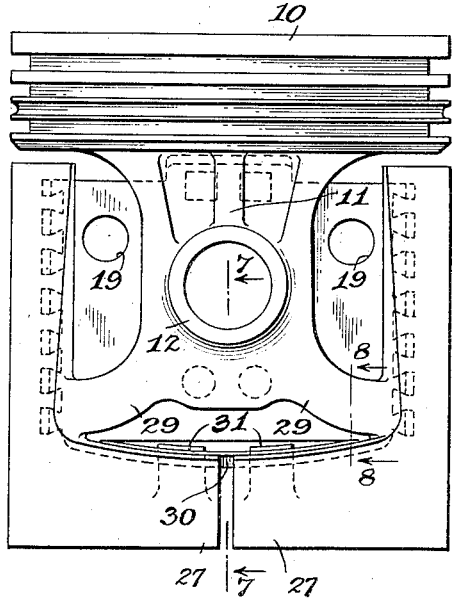
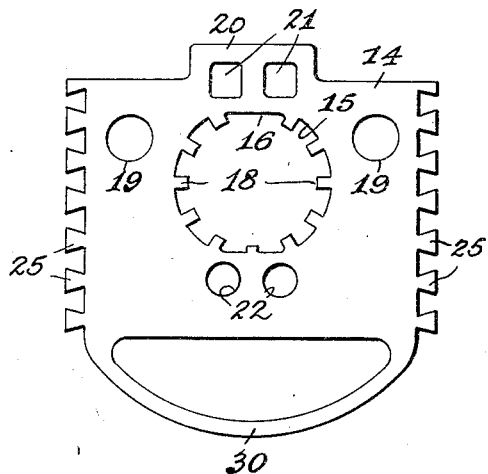
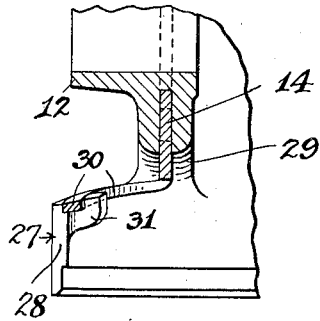
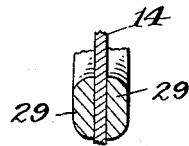
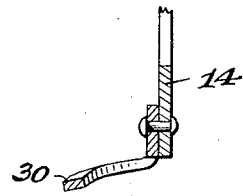
Adolph L. Nelson Inventor
By his Attorney
Frank Hent Patented June 25, 1935

2,006,009

UNITED STATES PATENT OFFICE 2,006,009

PISTON

Adolph L. Nelson, Detroit, Mich., assignor to Bohn Aluminum & Brass Corporation, Detroit, Mich.

Application May 15, 1928, Serial No. 278,026
Renewed March 26, 1931

46 Claims. (Cl. 309—13)

This invention relates to pistons such as are used in internal combustion engines, and aims to improve the construction of such pistons.

The invention has particular reference to a piston composed in part of light weight metal and in which a pair of relatively inexpansible struts are used to determine the spacing of the thrust faces of the piston.

A particular object of the invention is to provide improved means for tying the thrust faces to the piers which depend from the head and carry the piston pin bosses.

A further feature of the invention resides in the arrangement of means carried by the struts for supporting the parts of the skirt wall which lie below the piston pin bosses.

The present application is in part a continuation of copending applications Serial Nos. 617,585, 643,499, 35,703 and 38,826.

While preferred embodiments of the invention have been disclosed for purposes of illustration, it should be understood that various changes can be made in the structure without departing from the spirit and scope of the invention as hereinafter set forth and claimed.

In the drawings:

Fig. 5 is a view similar to Fig. 1 but showing several modifications of structure.

Fig. 6 is a plan view of the blank strut used in the piston of Fig. 5.

Fig. 7 is a section on line 7—7 of Fig. 5.

Fig. 8 is a section on line 8—8 of Fig. 5.

Fig. 9 is a detailed section illustrating a modified strut construction.

Figure 1:
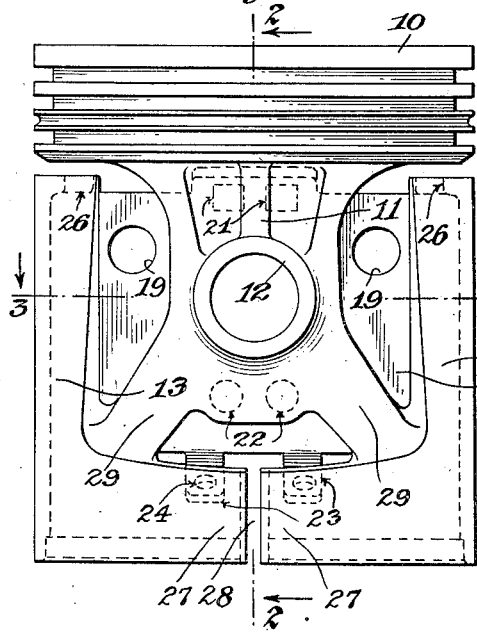
Fig. 1 is a side elevation of a piston embodying the invention.

Referring to the drawings more particularly the piston comprises a head 10, a pair of piers 11 depending from the head and carrying piston pin bosses 12, and a pair of thrust faces 13. The head, piers and thrust faces are preferably formed of some light-weight metal, such as an alloy of aluminum, and the spacing of the thrust faces along a piston diameter passing through the center of the thrust faces is under the influence of a pair of relatively inexpansible struts 14. The thrust faces are separated from the piers by openings extending downwardly from the upper end of the skirt, and the struts extend across the gaps formed by said openings.

Figure 4:
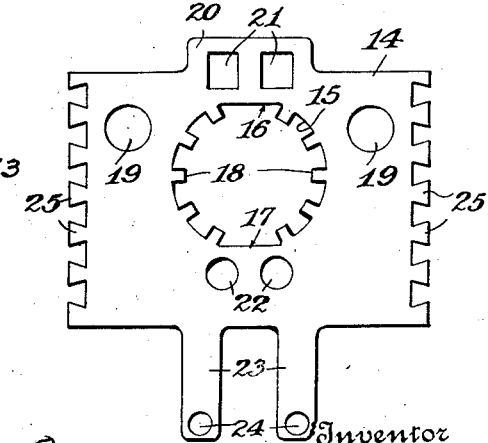
Fig. 4 is a plan view of the blank strut used in the piston of Fig. 1.

The struts are preferably formed of some material having a lower coefficient of thermal expansion than the light weight metal. For example, the struts may be formed of a steel having a suitable composition to give it the properties desired. These struts are first stamped out in blanks of the shape shown in Fig. 4, with a central hole 15, which is flattened above and below at 16 and 17, and with projections 18 extending into the hole. Two apertures 19 provide means for centering the strut in the mold. An extension 20 rises above the center of the strut, and a pair of apertures 21 are formed partly through the strut body and partly through the extension 20. A second pair of apertures 22 extend through the strut below the central opening 15. A pair of support arms 23 depend from the lower edge of the strut near its center, a hole 24 being formed in the end of each arm 23. The lateral sides of the strut are given any suitable formation, such as the dove-tail fingers 25, for forming an effective cast-in joint with the material of the thrust faces. The projections 18 and 25 are irregularities that form interlocking joints when they are embedded in the metal parts of the piston.

After the struts have been stamped they are bent to shape. In this bending operation (see Figs. 2 and 3) the extension 20 and the projections 18 are bent forward and the support arms 23 are bent forward with their extreme ends given a downward incline. The projections 25 are bent to a rearward angle, so that in the completed piston they are bent inwardly so that the projections 25 of one strut extend toward the other strut.

Figure 2:
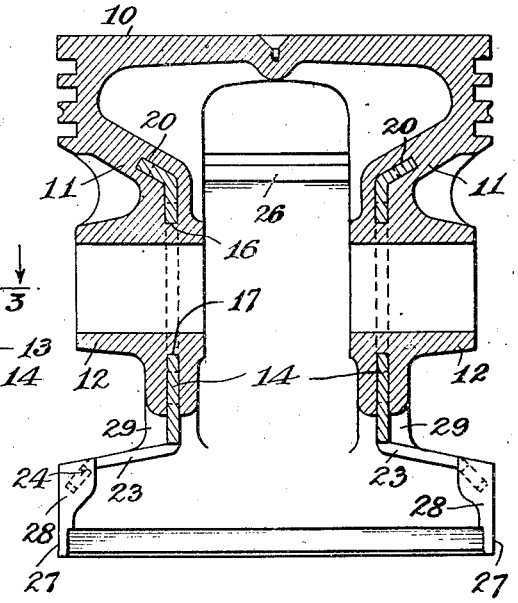
Fig. 2 is a section on line 2—2 of Fig. 1.
Figure 3:
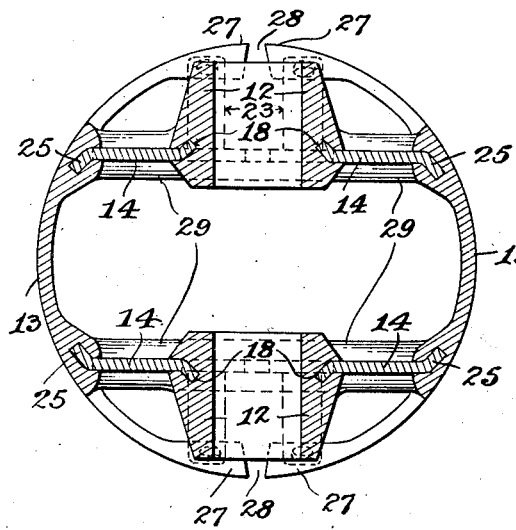
Fig. 3 is a section on line 3—3 of Fig. 1.

After the struts have been thus prepared a pair of them are placed in a suitably shaped mold in the relative positions indicated in Figs. 2 and 3, the holes 19 being engaged by projections on the mold to properly position and hold the struts. The molten piston metal is then poured into the mold and surrounds portions of the struts to form cast-in joints as will be clear from Figs. 2 and 3.

Referring again to the finished piston, it will be seen that the material of the pier extends down along both the inside and the outside of the strut. The material of the pier passes through the apertures 21 and 22, thereby bonding the pier and anchoring the strut. The strut is further gripped by the material of the pier passing through the opening 15 and surrounding the extensions 18.

The lateral edges of the thrust faces have cast-in joints with the ends of the struts as shown in Fig. 3, and a stiffening rib 26 extends along the upper edge of each thrust face.

At the lower end of the piston the material is formed into a substantially continuous rim, the two halves of the rim being separated by slots 28. The two wings 27 of the skirt lying on opposite sides of each slot 28 are spaced from the main body of the strut but are supported by the arms 23 due to the fact that the end of one of the arms is cast-in near the tip of each wing. This method of supporting the wings can be used in many piston designs, and serves to tie in the wings and facilitates machining.

The thrust faces 13 extend upwardly from the lower circular portion and are connected to the piers 11 by ties 29 which are continuous and homogeneous with the piers and with the thrust faces. These ties furnish support for the thrust faces, and are arranged at angles extending downwardly and outwardly from the piers. This arrangement of the ties permits them to yield should such action become necessary due to the expansion of the piston metal. The drawings show the ties extending along both the inside and the outside of the strut, but they may be omitted on one side if desired. When it is said that the ties extend at a downward angle from the piers, it is meant that the general direction of the ties is at an angle between the vertical and horizontal when the piston is standing in the position of Figure 1.

In the piston illustrated in Figs. 5 to 8 the general arrangement is similar to that already described, but in this case the ties 29 have been curved downwardly so that the ties may yield both ways.

Another modification resides in the means for supporting the wings 27. In this case the curved support 30 projects from the lower edge of the strut, and in forming the strut this support is bent to the position indicated in Figs. 5 and 7. Each of the wings 27 is formed with a hook 31 which extends around the lower and inner sides of support 30 and ties in the wing.

In the drawings the support 30 and arms 23 are shown as being continuous and homogeneous with the strut body, but they may be formed separately from the strut and attached thereto by welding or riveting as shown in Fig. 9.

I claim:

1. A piston comprising a head, piers depending from the head and carrying piston pin bosses, a pair of thrust faces having their upper ends spaced from the head and the piers, a pair of ties extending at a downward angle from the piers to each thrust face, the ties being homogeneous with the piers and with the thrust face, and a strut of relatively inexpansible material associated with each pier and extending between the thrust faces.

2. A piston comprising a head, piers depending from the head and carrying piston pin bosses, a pair of thrust faces having their upper ends spaced from the head and the piers, a pair of ties extending from the piers to each thrust face, the ties being homogeneous with the piers and with the thrust face and being curved in a vertical plane to permit them to give under the expansive action of the piston material, and a strut of relatively inexpansible material associated with each pier and extending between the thrust faces.

3. A piston comprising a head, piers depending from the head and carrying piston pin bosses, a pair of thrust faces having their upper ends spaced from the head and the piers, the thrust faces, head and piers being formed of light weight metal, a plate-like strut of relatively inexpansible metal associated with each pier and extending from the pier to each thrust face, a pair of ties extending from the piers to each thrust face, the ties being homogeneous with the piers and with the thrust faces and extending along the struts at an angle from the horizontal to permit the ties to give under expansive action of the piston material.

4. A piston comprising a head, piers depending from the head and carrying piston pin bosses, a pair of thrust faces having their upper ends spaced from the head and the piers, the thrust faces, head and piers being formed of light weight metal, a plate-like strut of relatively inexpansible metal associated with each pier and extending from the pier to each thrust face, a pair of ties extending from the piers to each thrust face, the ties being homogeneous with the piers and with the thrust faces and being curved in a vertical plane to permit them to give under the expansive action of the light weight metal.

5. A piston comprising a head, piers depending from the head and carrying piston pin bosses, a skirt connected to the piers and comprising thrust faces and a lower circular portion, a strut of relatively inexpansible material associated with each pier and extending between the thrust faces, and a support member carried by each strut and engaging said circular portion at a point below each pin boss.

6. A piston comprising a head, piers depending from the head and carrying piston pin bosses, a skirt connected to the piers and comprising thrust faces and a lower circular portion, the head and skirt being formed of light weight metal, a strut of relatively inexpansible material associated with each pier and extending between the thrust faces, and a support member carried by each strut and engaging said circular portion at a point below each pin boss.

7. A piston comprising a head, piers depending from the head and carrying piston pin bosses, a skirt connected to the piers and comprising thrust faces and a lower circular portion, the circular portion being slit below each pin boss to form a plurality of wings, a strut of relatively inexpansible material associated with each pier and extending between the thrust faces, each of the wings being supported by an arm carried by one of said struts.

8. A piston comprising a head, piers depending from the head and carrying piston pin bosses, a skirt connected to the piers and comprising thrust faces and a lower circular portion, the head and skirt being formed of light weight metal, the circular portion being slit below each pin boss to form a plurality of wings, a strut of relatively inexpansible material associated with each pier and extending between the thrust faces, each of the wings being supported by an arm carried by one of said struts.

9. A piston comprising a head, piers depending from the head and carrying piston pin bosses, a skirt connected to the piers and comprising thrust faces and a lower circular portion, the circular portion being slit below each pin boss to form a plurality of wings, a strut of relatively inexpansible material associated with each pier and extending between the thrust faces, each of the wings being supported by an arm carried by one of said struts, and having a cast-in joint with the wing.

10. A piston comprising a head, piers depending from the head and carrying piston pin bosses, a skirt connected to the piers and comprising thrust faces and a lower circular portion, the head and skirt being formed of light weight metal, the circular portion being slit below each pin boss to form a plurality of wings, a strut of relatively inexpansible material associated with each pier and extending between the thrust faces, each of the wings being supported by an arm carried by one of said struts, and having a cast-in joint with the wing.

11. A piston comprising a head, piers depending from the head and carrying piston pin bosses, a skirt connected to the piers and comprising thrust faces and a lower circular portion, the circular portion being slit below each pin boss to form a plurality of wings, a strut of relatively inexpansible material associated with each pier and extending between the thrust faces, and a loop support member extending from one of the struts and engaging the two wings located below one of the pin bosses.

12. A piston comprising a head, piers depending from the head and carrying piston pin bosses, a skirt connected to the piers and comprising thrust faces and a lower circular portion, the head and skirt being formed of light weight metal, the circular portion being slit below each pin boss to form a plurality of wings, a strut of relatively inexpansible material associated with each pier and extending between the thrust faces, and a loop support member extending from one of the struts and engaging the two wings located below one of the pin bosses.

13. A piston comprising a head, piers depending from the head and carrying piston pin bosses, a skirt connected to the piers and comprising thrust faces and a lower circular portion, the circular portion being slit below each pin boss to form a plurality of wings, a strut of relatively inexpansible material associated with each pier and extending between the thrust faces, and a loop support member extending from one of the struts and engaging the two wings located below one of the pin bosses, the wings having a positive connection with the loop.

14. A piston comprising a head, piers depending from the head and carrying piston pin bosses, a skirt connected to the piers and comprising thrust faces and a lower circular portion, the head and skirt being formed of light weight metal, the circular portion being slit below each pin boss to form a plurality of wings, a strut of relatively inexpansible material associated with each pier and extending between the thrust faces, and a loop support member extending from one of the struts and engaging the two wings located below one of the pin bosses, the wings having a positive connection with the loop.

15. A piston comprising a head, piers depending from the head and carrying piston pin bosses, a pair of thrust faces, a pair of struts of relatively inexpansible material extending between the thrust faces above and below the opening for the piston pin, and a pair of ties extending from the piers to each thrust face, the ties being homogeneous with the piers and with the thrust faces and extending at a downward angle from the piers to each thrust face.

16. A piston comprising a head, piers depending from the head and carrying piston pin bosses, a pair of thrust faces, the thrust faces, head and piers being formed of light-weight material, a pair of struts of material less expansible than the material of the thrust faces, the struts extending between the thrust faces above and below the opening for the piston pin, and a pair of ties extending from the piers to each thrust face, the ties being homogeneous with the piers and with the thrust faces and extending at a downward angle from the piers to each thrust face.

17. A piston comprising a head, piers depending from the head and carrying piston pin bosses, a pair of thrust faces, a pair of struts of relatively inexpansible material extending between the thrust faces above and below the opening for the piston pin, and a pair of ties extending from the piers to each thrust face, the ties being homogeneous with the piers and with the thrust faces and extending along the struts at a downward angle from the piers to each thrust face.

18. A piston comprising a head, piers depending from the head and carrying piston pin bosses, a pair of thrust faces, the thrust faces, head and piers being formed of light-weight material, a pair of struts of material less expansible than the material of the thrust faces, the struts extending between the thrust faces above and below the opening for the piston pin, and a pair of ties extending from the piers to each thrust face, the ties being homogeneous with the piers and with the thrust faces and extending along the struts at a downward angle from the piers to each thrust face.

19. A piston comprising a head, piers depending from the head and carrying piston pin bosses, a skirt including a lower circular part and thrust faces projecting upwardly from the circular part, a pair of struts of relatively inexpansible material extending between the thrust faces above and below the opening for the piston pin, and a pair of ties extending from the piers to each thrust face, the ties being homogeneous with the piers and with the thrust faces and extending at a downward angle from the piers to each thrust face.

20. A piston comprising a head, piers depending from the head and carrying piston pin bosses, a skirt including a lower circular part and thrust faces projecting upwardly from the circular part, the head, piers and thrust faces being formed of light-weight material, a pair of struts of material less expansible than the material of the thrust faces, the struts extending between the thrust faces above and below the openings for the piston pin, and a pair of ties extending from the piers to each thrust face, the ties being homogeneous with the piers and with the thrust faces and extending along the struts at a downward angle from the piers to each thrust face.

21. A piston comprising a head, piers depending from the head and carrying piston pin bosses, a pair of thrust faces having their upper ends spaced from the head, a tie extending from each pier and connected to each thrust face, the general direction of the ties being at an angle between the vertical and the horizontal, the ties being homogeneous with the piers and with the thrust faces, and a strut of relatively inexpansible material associated with each pier and extending between the thrust faces.

22. A piston comprising a head, piers depending from the head and carrying piston pin bosses, a pair of thrust faces, a pair of struts of relatively inexpansible material extending between the thrust faces and having their ends anchored to the thrust faces, the struts being in the form of rectangular plates apertured in line with the openings of the piston pin bosses, and a pair of ties extending from each pier to each thrust face, the ties being homogeneous with the piers and with the thrust faces and extending at a downward angle from the piers to each thrust face.

23. A piston comprising a head, piers depending from the head and carrying piston pin bosses, a pair of thrust faces, the thrust faces, head and piers being formed of light-weight material, a pair of struts of material less expansible than the material of the thrust faces, the struts extending between the thrust faces and having their ends anchored to the thrust faces, the struts being in the form of rectangular plates apertured in line with the openings of the piston pin bosses, and a pair of ties extending from each pier to each thrust face, the ties being homogeneous with the piers and with the thrust faces and extending at a downward angle from the piers to each thrust face.

24. In a piston, a sectional skirt, a head separate therefrom, and parallel struts uniting the sections of the skirt to each other and to the head, said struts having dovetailed connection with sections at opposite sides of the piston.

25. In a piston, a head, a skirt comprising a pair of arcuate aprons, and a pair of struts of relatively inexpansible material each secured at one end to one apron and at the other end to the other apron, the ends of the struts being dovetailed and buried in the material of the aprons.

26. A piston comprising a head, piers depending from the head and carrying piston pin bosses, a pair of thrust faces formed of light-weight material, a pair of chordal struts of material different from the material of the thrust faces, the struts being in the form of thin plates and extending vertically from near the upper ends of the thrust faces to points below the pin bosses, the ends of each strut being formed with dovetails and buried in the thrust faces.

27. In a piston of the class described, comprising a split wall of a metal having a high coefficient of expansion, a plate having a low coefficient of expansion embedded in the wall bridging the gap formed by said split wall, and an interlocking joint between said plate and wall to prevent expansion of said wall.

28. In a piston of the class described comprising, a split wall of a metal having a high coefficient of expansion, a plate having a low coefficient of expansion bridging the gap formed by said split, and a plurality of dovetail projections at the opposite sides of said plate adapted to be embedded in said wall to form an interlocking joint.

29. In a piston of the class described comprising, a split wall of a metal having a high coefficient of expansion, a plate having a low coefficient of expansion bridging the gap formed by said split, and a plurality of dovetail projections on said plate adapted to be embedded in said wall, said projections being bent inwardly out of the plane of the plate to form an interlocking joint between said plate and said split wall.

30. A strut of the class described comprising, a plate of metal having a relatively low coefficient of expansion, and a plurality of dovetail projections on opposite sides of said plate adapted to be embedded in the walls of a metal having a relatively high coefficient of expansion, said projections extending inwardly out of the plane of the plate.

31. A strut of the class described comprising, a plate of metal having a relatively low coefficient of expansion, a plurality of projections bent away from the plane of said plate around the periphery of a central opening in said plate, and a plurality of dovetail projections on outer surfaces of said plate, said projections adapted to be embedded in the walls of a metal having a relatively high coefficient of expansion.

32. A strut of the class described comprising, a plate having an opening therein, a plurality of dovetail projections on at least two sides of said plate, and a plurality of dovetail projections on the inner periphery of the opening in said plate.

33. A strut of the class described comprising, a plate having an opening therein and having a relatively low coefficient of expansion, a plurality of dovetail projections on at least two sides of said plate, and extending at an angle to the plane of the plate, and a plurality of dovetail projections on the inner periphery of the opening in said plate and extending at an angle to the plane of the plate.

34. A piston having a head, piston pin bosses integral with the head, a skirt having a circular portion below the piston pin bosses and upward extensions at the sides between said bosses, and struts of material having a relatively low coefficient of expansion uniting the pin bosses to the upward extensions of the skirt said struts having irregularities buried in the pin bosses and the skirt extensions for holding the struts in place, substantially as set forth.

35. A piston having a head, piston pin bosses integral with the head, a skirt having a ring-like portion below the piston pin bosses and upward extensions at the sides between said bosses, the head and skirt being formed of a light-weight piston material, and struts of material having a lower coefficient of expansion than the skirt material uniting the pin bosses to the upward extensions of the skirt, said struts having irregularities buried in the pin bosses and the skirt extension for holding the struts in place, the upper ends of said skirt extensions being separated from the head.

36. A piston having a head, piston pin bosses integral with the head, a skirt having a ring-like portion below the piston pin bosses and upward extensions at the sides between said bosses, the head and skirt being formed of a light-weight piston material, and struts of material having a lower coefficient of expansion than the skirt material extending chordally across the skirt and embedded in the pin bosses, said struts having irregularities buried in the skirt extensions for holding the struts in place, the upper ends of said skirt extensions being separated from the head.

37. A piston comprising a head and a skirt formed of light-weight material having a relatively high rate of thermal expansion, the skirt being formed with at least one opening extending downwardly from the upper end thereof, a plate of material having a lower rate of thermal expansion than the skirt material bridging the gap formed by said opening, the plate having interlocking joints with the skirt wall on opposite sides of said gap to control the expansion of the skirt.

38. A piston comprising a head, piers depending from the head and carrying piston pin bosses, a skirt having oppositely located thrust faces, the head and skirt being formed of light-weight material having a relatively high rate of thermal expansion, and a pair of plates of material having a lower rate of thermal expansion than the material of the skirt extending from one thrust face to the other, each plate having its ends anchored to the thrust faces by interlocking joints.

39. A piston comprising a head, piers depending from the head and carrying piston pin bosses, a skirt having oppositely located thrust faces, the head and skirt being formed of light-weight material having a relatively high rate of thermal expansion, and a pair of plates of material having a lower rate of thermal expansion than the material of the skirt extending from one thrust face to the other, each end of each plate carrying a plurality of dovetail projections embedded in the thrust faces to form interlocking joints.

40. A piston comprising a head, piers depending from the head and carrying piston pin bosses, a skirt having oppositely located thrust faces, the head and skirt being formed of light-weight material having a relatively high rate of thermal expansion, a pair of plate-like struts of material having a lower rate of thermal expansion than the material of the skirt extending transversely of the axis of the pin bosses from one thrust face to the other, each strut having its ends anchored to the thrust faces by interlocking joints, and each thrust face having its upper end separated from the head and piers except for the connection afforded by the struts.

41. A piston comprising a head, piers depending from the head and carrying piston pin bosses, a skirt having oppositely located thrust faces, the head and skirt being formed of light-weight material having a relatively high rate of thermal expansion, a pair of plate-like struts of material having a lower rate of thermal expansion than the material of the skirt extending transversely of the axis of the pin bosses from one thrust face to the other, each strut carrying at its ends a plurality of dovetail projections that are embedded in the skirt to form interlocking joints, and each thrust face having its upper end separated from the head and piers except for the connection afforded by the struts.

42. A piston comprising a head, piers depending from the head and carrying piston pin bosses, a skirt having oppositely located thrust faces, the head and skirt being formed of light-weight material having a relatively high rate of thermal expansion, and a pair of plates of material having a lower rate of thermal expansion than the material of the skirt extending from one thrust face to the other, each end of each plate carrying a plurality of dovetail projections embedded in the thrust faces and bent inwardly out of the plane of the plate to form interlocking joints.

43. A piston comprising a head, piers depending from the head and carrying piston pin bosses, a skirt having oppositely located thrust faces, the head and skirt being formed of light-weight material having a relatively high rate of thermal expansion, a pair of plate-like struts of material having a lower rate of thermal expansion than the material of the skirt extending transversely of the axis of the pin bosses from one thrust face to the other, each end of each strut carrying a plurality of dovetail projections embedded in the thrust faces and bent inwardly out of the plane of the plate to form interlocking joints.

44. A piston strut comprising a plate of metal having a relatively low rate of thermal expansion, a plurality of dovetail projections on opposite sides of said plate, said dovetails extending at angles to the main body of the strut and adapted to be embedded in the walls of a piston of material having a higher rate of thermal expansion than the strut material.

45. A piston strut comprising a plate of metal having a relatively low rate of thermal expansion, having an opening therein, a plurality of dovetail projections on at least two sides of said plate, and a plurality of dovetail projections on the inner periphery of the opening in said plate, all of said dovetails being adapted to be embedded in parts of a piston of material having a higher rate of thermal expansion than the strut material.

46. A piston comprising a head, piers depending from the head and carrying piston pin bosses, oppositely disposed thrust faces, the head and piers being formed of light-weight material having a relatively high rate of thermal expansion, a pair of plate-like struts formed of material having a lower rate of thermal expansion than the material of the head extending from one thrust face to the other, and having their intermediate portions embedded in a pier, each strut having an opening alined with the openings in the pin bosses, and a plurality of projections on the inner periphery of the opening in the plate, said projections being buried in the material of a pier.

ADOLPH L. NELSON.